Patented May 12, 1942

2,282,796

UNITED STATES PATENT OFFICE 2,282,796

VITAMIN PRODUCT

Sidney Musher, New York, N. Y., assignor to Musher Foundation Incorporated, New York, N. Y., a corporation of New York No Drawing. Original application December 22, 1939, Serial No. 310,555. Divided and this application November 22, 1941, Serial No. 420,131

9 Claims. (Cl. 260—412.8)

This invention relates to the production of pro-vitamin A and vitamin K from dried alfalfa and similar fodder and forage legumes and grasses.

This application is a division of application Serial No. 310,555, filed December 22, 1939.

In accordance with this invention, finely divided alfalfa or other fodder or legume grass is first dried preferably to under 20% moisture content.

Although the alfalfa may be dried by exposure in a relatively thin film under sunlight or at moderate temperatures, the drying is much more preferably done at a temperature of substantially over 150° F. and preferably at a temperature of at least 250° F. or higher. Under the conditions of the heat treatment and during the drying of the fodder legume, the desired constituents of the fodder legume are retained to a greater degree and the dried legume may then be subjected to treatment.

For example, in drying, the alfalfa may be placed in a revolving cylinder having inside paddles to produce agitation and air may be blown over and through the alfalfa, the heated air being at a temperature of approximately 1000° F. at the time it is introduced into the chamber.

This air is desirably run through the alfalfa while the latter is being agitated to produce a temperature in it of substantially above 150° F. and until the moisture content is reduced from approximately between 65% and 75% to below about 20% and preferably below about 10%.

The substantially dried alfalfa and after particularly having been dried at the elevated temperatures described, is then prepared by grinding or finely macerating a sufficient quantity of glyceride oil, preferably cod liver or other fish oil, with the dried grass, and then expressing in a plate press to remove the cod liver oil-pro-vitamin A combination which contains substantially all the pro-vitamin A and vitamin K contained in the dried grass, leaving behind a residue which is valuable for feeding purposes.

In accordance with this invention, the dried fodder legume and grass, such as alfalfa, is ground to a finely milled, oily paste using for example 3 parts by weight of cod liver oil to 1 part by weight of the alfalfa, the paste being perfectly smooth. The grinding is preferably conducted using stone or iron rollers operating on a stationary plate whereby a fine maceration and breakdown of the grass or alfalfa cells are obtained. The mixture may also be put through a colloid mill in order to break into the individual cells of the grass or alfalfa and permit the grass or alfalfa oil to be released and replaced by the added oil.

The time of grinding may vary from about 15 seconds upwards although generally a grinding period of about 30 seconds is sufficient thoroughly to break through the cell structure of the grass.

The paste thus obtained is desirably not subjected to a screw type expression for the paste is not readily held in the grinding chamber. Instead, the paste is placed in a pot type press whereby a tight fitting piston operating under great pressure expresses the oil from the paste without the paste exuding from the sides of the press or by the use of a hydraulic or plate press. Thus the paste is expressed in batches.

The oil thus obtained contains substantially all of the pro-vitamin A of the grass, and may desirably be used as a high vitamin containing oil for pharmaceutical purposes, for fortifying other oils, preferably glyceride oils, or other foods, and particularly for addition to animal feeds such as in preparing complete poultry feeds.

The oil and pro-vitamin A combination may also be homogenized into milk, preferably skimmed, and then concentrated or dried so that the vitamins are placed into substantially water soluble or milk soluble condition and used for addition to aqueous human food or animal feed compositions such as to milk, candies, confections, beverages, ice cream, bakery products, etc.

The vitamin containing oil may, for example, be homogenized with skim milk on the basis of adding between 3% and 7% of the oil to skim milk having 9% total milk-solids-not-fat and, after homogenizing, dried or concentrated to about 70% total solids or more.

The oil used for forming into a paste with the grass is desirably a glyceride oil of fish origin, such as cod liver oil, halibut liver oil, tuna fish liver oil, shark liver oil, herring oil, mackerel oil, salmon oil, or menhaden oil. Other glyceride oils which may also be utilized are the animal and vegetable oils and fats, in crude, virgin, refined or hydrogenated condition, such as olive oil, cottonseed oil, sesame oil, peanut oil, soya bean oil, corn oil, and lard.

Although the proportion of 3 parts of cod liver oil to every 1 part of dried grass by weight is specifically called for and is the desirable proportion to use in order to produce the most desirable pro-vitamin A-cod liver oil combination, other proportions may be employed varying from 1 part to about 5 parts by weight of the glyceride oil to every 1 part of the grass.

The oily viscous paste before expression desirably contains over about 30% total solids and preferably 35% or more total solids.

It is undesirable to use larger proportions of the glyceride oil because the grass is then diluted in too large a quantity of the added glyceride oil.

Where desired, the dried grass may, before grinding, be allowed to soak for a period of from 15 minutes to 12 hours in an equal amount by weight of the glyceride oil in order to soften the cellular structure and enable the paste to be formed more readily.

The residue which is obtained after the paste is expressed by means of the pot type or plate press is desirably subjected to a second expression in a screw type expeller to remove an additional quantity of the grass or alfalfa and added oil combination and in order to obtain a greater yield. Although the paste cannot be handled by the ordinary screw type expeller, after the paste has been expressed by means of the special piston type or plate expeller, the residue may then be handled by the ordinary screw type expeller, or it may be solvent extracted.

The oil obtained in accordance with the procedures of the present invention contains substantially all the pro-vitamin A and vitamin K of the alfalfa and the glyceride oil-alfalfa extract combination as obtained shows no objectionable odor of the alfalfa, is free of undesirable flavor and odor developing materials and may be widely used for pharmaceutical purposes, for fortifying other oils, preferably glyceride oils or other foods, and particularly for animal feeds such as in preparing complete poultry feeds.

Among the fodder and forage legumes and grasses are included the Leguminosae, and particularly alfalfa, crimson clover, alsike clover, China bean, vetch, Japan clover, red clover and the leaves and stems of the soya bean, peanut, and pea. Other fodder legumes include spring vetch, winter vetch, sainfoin and serradella. The dried hay of the legume grasses as well as the green fodder legumes are also included. These fodder legumes may be in either mature or immature condition.

In the use of alfalfa as a fodder legume there is included alfalfa meal, alfalfa leaf meal and alfalfa stem.

The average composition of fodder legumes before drying is as follows:

| | Percent |
|---|---|
| Water | 75 |
| Protein | 3 |
| Fat | 1 |
| Nitrogen free extract | 11 |
| Fiber | 7 |
| Ash | 3 |

After drying, the average composition of these legume fodders is as follows:

| | Percent |
|---|---|
| Water | 10 |
| Protein | 14 |
| Fat | 3 |
| Nitrogen free extract | 41 |
| Fiber | 24 |
| Ash | 8 |

There are also included the cereal grasses and particularly those of the Gramineae, whether in immature or mature condition and including the grasses produced from maize or corn, timothy, sorghum, rye, oat and wheat. Other cereal grasses that are included are June grass, red top, tall oat grass, orchard grass, meadow fescue, and Hungarian grass.

The average composition of a cereal grass before drying is as follows:

| | Percent |
|---|---|
| Water | 72 |
| Protein | 2 |
| Fat | 1 |
| Nitrogen free extract | 15 |
| Fiber | 8 |
| Ash | 2 |

After drying, the average composition of a cereal grass is as follows:

| | Percent |
|---|---|
| Water | 11 |
| Protein | 7 |
| Fat | 2 |
| Nitrogen free extract | 45 |
| Fiber | 30 |
| Ash | 5 |

These fodder products broadly classified herein as fodder grasses are all high in moisture content, averaging 65% to 85% and are desirably dried before processing in accordance with the present invention. The drying step is important in order to obtain an oil from the paste carrying the most desirable characteristics of vitamin values and for pharmaceutical properties and food value.

It has also been found that particularly where, during the grinding operation, the paste is subjected to an elevated temperature of in excess of 200° F. and desirably to about 250° F. or more, and even to as high as 300° F. to 400° F. for short periods, the oil obtained by expression of the paste is of greater value and utility than where the elevated temperature is not applied to the paste. The vitamin containing oil from the heat treated paste has a better odor and flavor and the vitamins contained in that are much more resistant to oxidative deterioration.

It is not known why it is that when the paste is subjected to the elevated temperature treatment followed by expression, the resultant vitamin containing oil has improved stabilization and value for pharmaceutical and food purposes, but apparently some reaction occurs at the elevated temperature between the glyceride oil contained in the paste and the solids of the paste to obtain the enhanced effect.

The results of the present invention are obtained only when these fodder grasses are ground with the added oils to completely absorb and break the cellular structure. Unless the grinding procedure takes place using a sufficient quantity of oil to produce the oily paste, but at the same time a minimum quantity of oil so that an oily paste is actually produced, the most beneficial results are not obtained.

Although a glyceride oil is more particularly called for under this invention, there may much less preferably be utilized refined white mineral oil for admixture with the grass to form a paste and for subsequent expression of the paste as indicated above.

The oil obtained in accordance with the present invention may very desirably be used for homogenization or for preparation into colloidal form in a carrier consisting of molasses, preferably blackstrap molasses, or in the concentrated acid extract of corn. The coating of the individual globules of the oil obtained in accordance with the present invention with the molasses or extract will materially retard vitamin loss and the oil obtained in accordance with the present invention is ideally suited for this purpose.

Having described my invention, what I claim is:

1. A method of extracting a vitamin containing oil from fodder and forage legumes and grasses which comprises grinding said legumes and grasses in low moisture condition with an oil selected from the group consisting of the glyceride oils and mineral oil to form an oily viscous paste containing in excess of about 30% total solids until the oil has been extracted from said legumes and grasses and then expressing the oil from the solids, whereby there is produced a high quality and highly stable oil.

2. A method of extracting a vitamin containing oil from alfalfa, which comprises grinding said alfalfa in low moisture condition with a glyceride oil to form an oily viscous paste until the oil has been extracted from said alfalfa and then expressing the oil from the solids, whereby there is produced a high quality and highly stable glyceride oil.

3. A method of extracting an oil from alfalfa which comprises grinding said alfalfa in low moisture condition with cod liver oil to form an oily viscous paste containing in excess of about 25% total solids until the oil has been extracted from said alfalfa and then expressing the oil from the solids whereby there is produced a high quality and highly stable glyceride oil.

4. A highly stabilized glyceride oil carrying the oil soluble constituents of a finely divided oily paste of low moisture containing fodder and forage legumes and grasses, extracted after prolonged grinding of the glyceride oil with the fodder and forage legumes and grasses, said paste containing in excess of about 25% total solids.

5. A process of obtaining an alfalfa residue in which the alfalfa oil has been replaced by cod liver oil which comprises grinding the alfalfa to a finely milled oily paste with cod liver oil, and then crushing the paste to remove the oil therefrom.

6. A process of removing substantially all of the alfalfa oil from alfalfa which comprises grinding about 1 part by weight of alfalfa with about 3 parts by weight of cod liver oil to form a finely milled oily paste, continuing said grinding for a period varying from about 15 to 30 seconds, and expressing the resultant paste to obtain a mixed oil which carries substantially all of the alfalfa oil of the alfalfa.

7. A process of treating alfalfa which comprises grinding low moisture containing alfalfa with a glyceride oil at a temperature of above at least 200° F. to form a paste and then expressing the paste to remove the oil therefrom.

8. A method of extracting a vitamin containing oil from fodder and forage legumes and grasses, which comprises grinding said legumes and grasses in low moisture condition with a glyceride oil to form an oily viscous paste until the oil has been extracted from said legumes and grasses and then expressing the oil from the solids, whereby there is produced a high quality and highly stable glyceride oil.

9. A method of extracting a vitamin containing oil from cereal grasses, which comprises grinding said cereal grasses in low moisture condition with a glyceride oil to form an oily viscous paste until the oil has been extracted from said cereal grasses and then expressing the oil from the solids, whereby there is produced a high quality and highly stable glyceride oil.

SIDNEY MUSHER.